Patented Apr. 24, 1923.

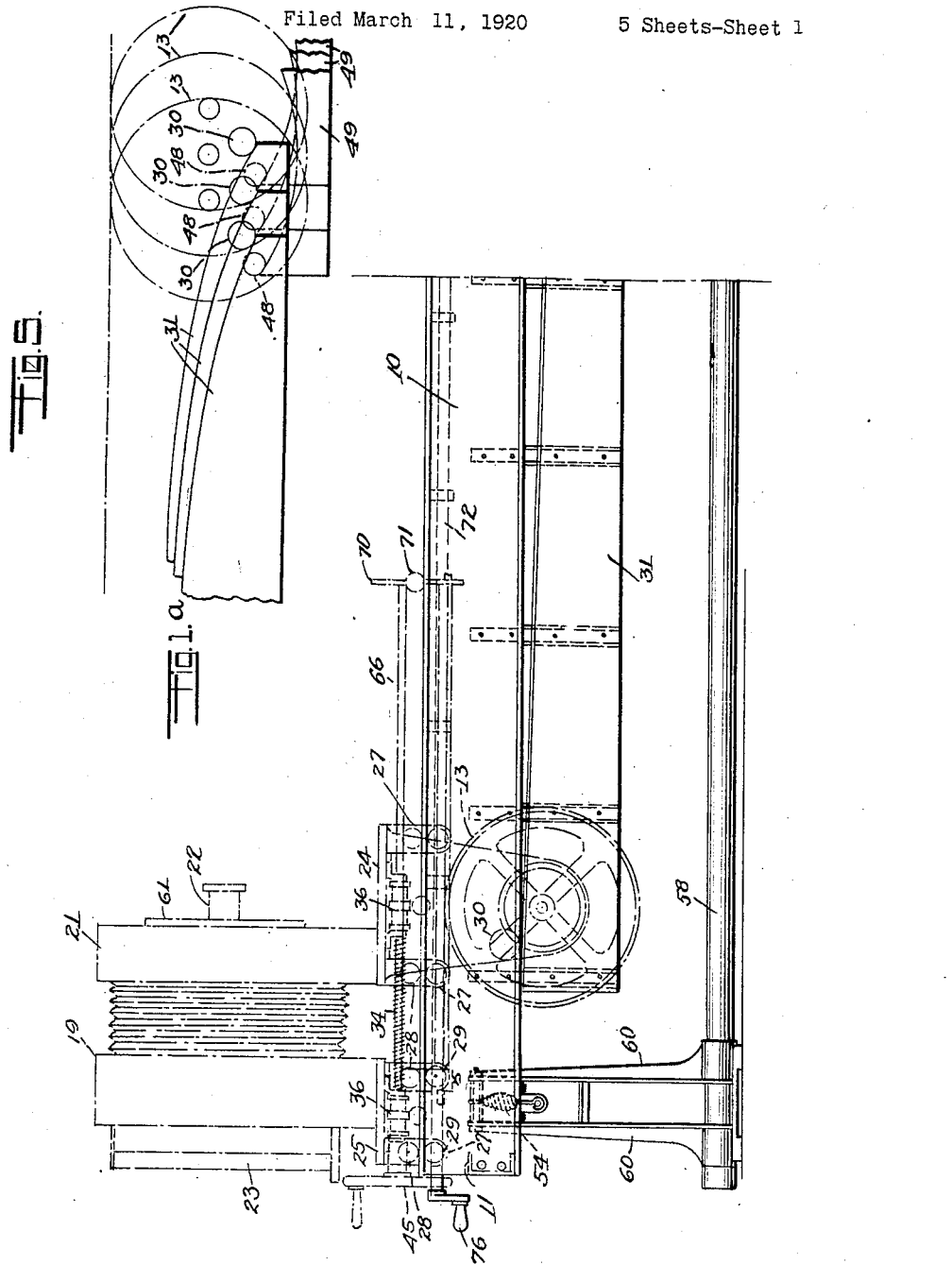

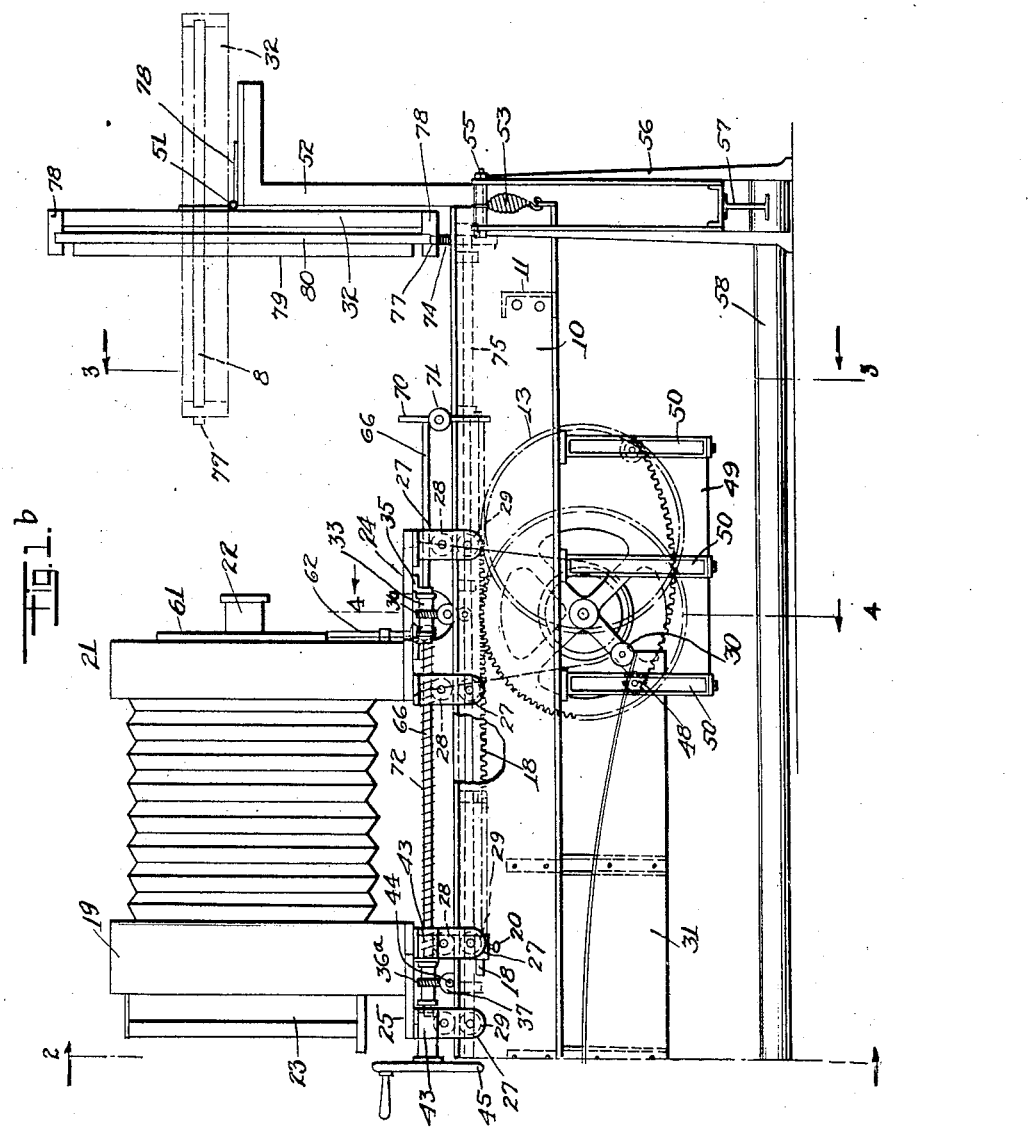

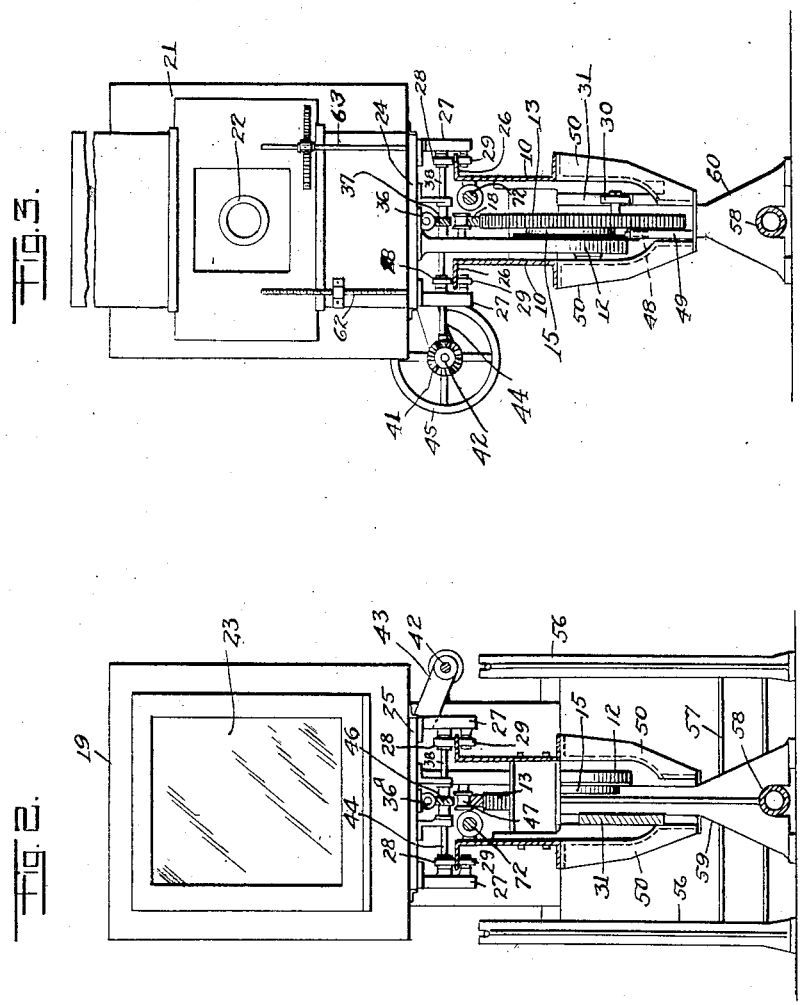

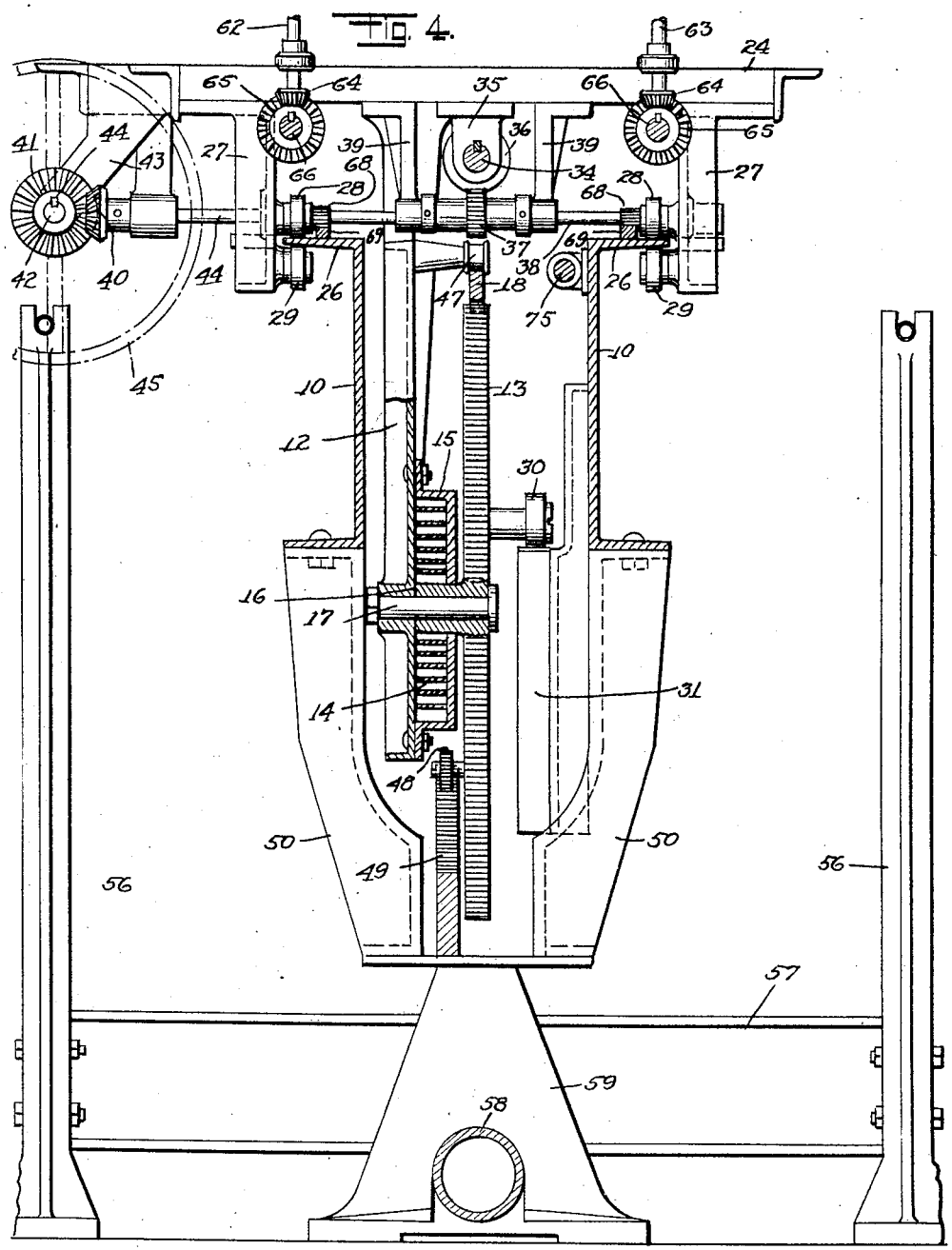

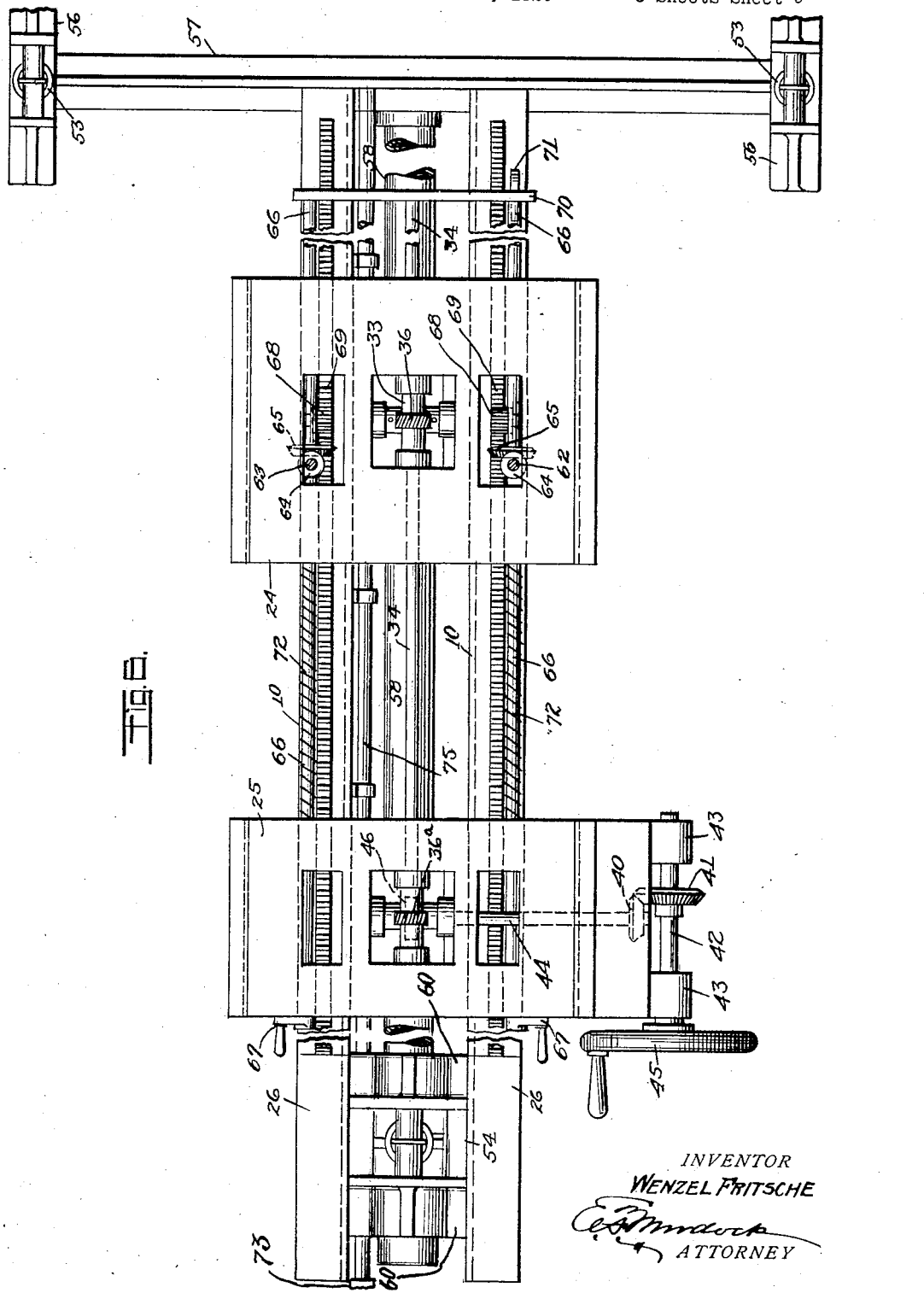

1,452,833

UNITED STATES PATENT OFFICE.

WENZEL FRITSCHE, OF NEW YORK, N. Y.

APPARATUS FOR AUTOMATICALLY FOCUSING MULTIPLE-EXPOSURE CAMERAS.

Application filed March 11, 1920. Serial No. 364,909.

*To all whom it may concern:*

Be it known that I, WENZEL FRITSCHE, a citizen of Germany, and a resident of the city of New York, borough of Manhattan, in the county and State of New York, have invented certain new and useful Improvements in Apparatus for Automatically Focusing Multiple-Exposure Cameras, of which the following is a full, clear, and exact description.

Among the principal objects which the present invention has in view are: to automatically focus a camera in relation to the space occupied on the sensitized plate; to economize time in the use of a camera of the character mentioned; to provide means for enlarging the photographic image; to enable the operator to concentrate his attention on the positioning of the photographic image on the ground glass or object plate; to avoid vibrating the camera and copy board during the employment thereof; and to vary the operation of the apparatus in correspondence with the lenses employed in the camera.

Drawings.

Figures 1$^a$ and 1$^b$ are divided or sectional views showing jointly a side elevation of the apparatus and a camera mounted thereon in operative connection therewith;

Figure 2 is a vertical cross section, the section being taken as on the line 2—2 in Figure 1$^b$;

Figure 3 is a vertical cross section, taken as on the line 3—3 in Figure 1$^b$;

Figure 4 is a vertical cross section on enlarged scale, the section being taken as on the line 4—4 in Figure 1$^b$;

Figure 5 is a diagrammatic view, showing end fragments of a plurality of focusing cams and rack sectors for focusing various cameras selectively in correspondence with the construction thereof; and Figure 6 is a plan view on enlarged scale and contracted, showing the supporting frame and movable trucks for mounting a camera disposed thereon.

Description.

As seen best in Figures 1$^a$ and 1$^b$, a frame is provided, having side rails 10, which are structurally and rigidly united by short cross braces 11 at and adjacent the opposite ends of the said rails. The rails 10, as seen in Figure 4 of the drawings, are disposed in spaced relation to form a runway therebetween for the passage of a suspension bracket 12, and mechanism associated therewith, which includes a large gear wheel 13, and the retractive spring 14 therefor. The spring 14 is held in a housing 15, which is stationary, and to which one end of the spring 14 is anchored, while the other end is secured to the hub 16 of the wheel 13. A stud shaft 17 forms the bearing for the wheel 13, and its hub 16.

The teeth of the wheel 13 are meshed with the teeth of a rack bar 18, that is fixedly attached to either the front or rear truck of an expanding or bellows camera. As shown in Figure 1$^b$, I prefer to attach the rear truck 25 to the rack bar 18, a wing nut 20 being employed to this end, with the result that by reason of the operation of the wheel 13 on the said rack bar during the movement of the camera lengthwise of the apparatus, the relation or approximation of the frame 19 to the frame 21 is changed, the movement securing the proper focusing of the image projected by the lens in the lens head 22 on the ground glass or sensitized plate held in the extension 23.

The frames 19 and 21 are mounted on independent trucks 24 and 25. These trucks are both and similarly mounted on the upper flanges 26 of the rails 10. For this purpose each truck has pendent side plates 27, inwardly from which are extended rollers 28 and 29, the former serving to support the trucks and parts associated therewith, and the latter to guide or steady the movement thereof. The said flange if necessary is machined, so that the path of travel of the trucks 24 and 25 is accurate. It will be understood that the truck 25 and frame 19 mounted thereon trail after the truck 24 and frame 21, by reason of the connection between the two trucks employing the bracket 12, wheel 13 and rack 18, said bracket being rigidly connected with the truck 24 and supporting in permanent relation the wheel 13. With this connection between the two trucks 24 and 25, and frames mounted thereon, it is obvious that the relation of the said trucks and frames will vary as the wheel 13 is rotated upon its shaft 17.

The office of the spring 14 is to rotate the said wheel counter-clockwise or in a manner that causes the roller 30 to bear on the cam board 31 constantly and positively. With this in mind, it is obvious when viewing Figures 1ª and 1ᵇ, that as the truck 24 and wheel 13 associated therewith is moved toward the copy board, the roller 30 passing to the lower position over the cam-shaped edge of the cam board 31, permits the spring 14 to retractably rotate the wheel 13, to move the rack bar 18 rearwardly, thereby separating the frame 19 from the frame 21, to accommodate the varying focus of the lens in the lens head 22. The curvature of the board 31 is carefully platted, to agree with the variable focus of the camera in the different approaches of the same to the copy board 21.

The truck 24 is primarily moved by rotating a nut 33, which is splined on the shaft 34, held between brackets 35 pendent from the under side of the platform of the truck 24. Integrally formed with, and extending from the nut 33 is a spiral gear wheel 36, the teeth whereof are meshed with the teeth of the spiral wheel 37, fixed on the shaft 38. Bearings for the shaft 38 are formed in brackets 39 extended from the under side of the platform of the truck 24, as shown best in Figure 4 of the drawings. Other bearings for the shaft 38 are formed in the plates 27. At one end of a short shaft 44 supported by the rear truck 25, is fixedly mounted a beveled pinion 40 the teeth whereof are meshed with the teeth of the beveled gear wheel 41. The beveled gear wheel 41 is mounted on a shaft 42, between brackets 43 pendent from one edge of the truck 25.

The shaft 42 is the main driving shaft of the apparatus, power being applied thereto by a hand wheel 45, which is turned by the attendant or camera man. The wheel 45 is permanently disposed in relation to the truck 25 and is properly supported therein. This arrangement permits the camera man to at all times maintain his position with reference to the ground plate in the extension 23, when moving the camera to and from the copy board 32.

The shafts 42 and 44 are rotated through the wheels 40 and 41. A spiral gear wheel 46 rotates the spiral gear wheel 36ª on the shaft 34. The shaft 34 and wheel 36, associated with the truck 24, rotates the wheel 37, and the shaft 38, whereon are mounted the pinions 68. The pinions 68 engage racks 69 on the flanges 26 of the rails 10. This platform 24 is therefore moved lengthwise of the apparatus in accord with the operation of the wheel 45.

Thus it will be seen that the camera man while standing in his position adjacent the extension 23 and ground glass therein, moves the frame 21 with the lens head 22 lengthwise of the apparatus, and to and from the copy board 32.

It will also be remembered that as the truck 24 and frame 21 thereon are moved, the roller 30 travels over the cam board 31, to permit the spring 24 to rotate the wheel 13 contra-clockwise; or to rotate the said wheel clockwise, in opposition to the said spring, with the result that the truck 25 and frame 19 are moved to vary their relation to the truck 24 and frame 21. The rack bar 18 is held in engagement with the wheel 13 by an idler roller 47.

As best seen in Figure 1ᵇ, when the truck 24 and parts associated therewith approach more nearly the copy board 32, the roller 30 passes from engagement with the cam board 31 and a small pinion 48 engages the teeth of a rack sector 49. The sector 49 is supported between the brackets 50 which are bolted to the bottom flange of the rails 10, at the far end of the cam board 31. The sector 49 is preferably disposed at the opposite side of the wheel 13 from the cam board 31 and roller 30.

After the pinion 48 has engaged the teeth of the sector 49, it is obvious that the forward movement of the wheel 13 causes the pinion 48 to rotate, and to travel relatively faster than the center of the wheel 13. This movement increases the relative speed of the wheel 13, with the result that for the same amount of forward movement of the truck 24 when controlled by the roller 30 on the cam 31 a fastener retractive movement of the truck 25 is produced when the wheel 13 is controlled by the sector 49 and pinion 48. This increases the elongation of the camera bellows, and the separation of the frames 19 and 21, and thus provides for a greater enlargement of the photographic image. It will be noted that the curvature of the sector 49 is platted in correspondence with the travel of the pinion 48.

As shown in Figure 1ᵇ the copy board 32 has a hinge 51, by which it is suspended from the bracket 52. This enables the operator to dispose the copy board in the position shown by broken lines in said figure, in which position it is more convenient to arrange the copy made of the copy board.

The copy board holder 32 is secured by a hinge 51 to a standard 52 at the forward extremity of the frame. The holder has guide rails 78 in which the copy board 79 is mounted by means of a back 80. To the lower end of the back 80 is attached a rack bar, with the teeth of which, is engaged a gear wheel 74. The teeth of the gear wheel 74 extends upward through a suitable opening in the lower rail 78 of the holder. The wheel 74 is rotated by means of the shaft 75 which extends to the rear of the frame where it is provided with a hand crank 76, as seen best in Fig. 1ª.

It is obvious that when it is desired to shift the board 79 laterally this can be accomplished by turning the shaft 75 and wheel 74 associated therewith, the operator, engaging for that purpose, the crank 76.

The rails 10 are preferably supported by suspension springs 53, and the spring 54. The springs 53 are suspended from bolts 55 in frames 56 disposed in separated relation at the forward or copy board carrying end of the frame. The brackets 56 are structurally united by a cross brace 57. To the cross brace 57 is rigidly attached a tubular brace 58, which, as seen in Figure 4 of the drawings, extends through and is mounted in the foot 59 of the single stand 60. By suspending the frame on which the camera travels, and upon which the copy board is mounted, by what is known as a three-point suspension, and by using springs for this suspension, all vibration is eliminated from the camera, and the copy board, due to vibration of the building in which the instrument is set, or from other cause.

The lens head 22 is preferably mounted in a sliding panel 61. The panel 61 is arranged for extension vertically and horizontally. To this end the said panel is operatively connected with shafts 62 and 63. The shafts 62 and 63 have beveled gears 64, which are engaged by beveled wheels 65 at the ends of shafts 66. The shafts 66 are extended to the rear of the camera and each is provided with a hand crank 67. The wheels 65 are slidably mounted on the shafts 66 between guide brackets to compensate for the movement of the frame 19 in relation to the frame 21. This construction is more fully set forth in a co-pending application for patent on improvements in multiple exposing cameras, said application bearing Serial No. 370,117, filed the 31st day of March, 1920, to which cross reference is made.

As seen best in Figure 6, the shafts 34 and 66 are supported at their forward end on the frame 70. The frame 70 is permanently related to the truck 25, wherein the rear ends of the said shafts 34 and 66 are supported. The frame 70 is removed from the truck 25 a distance greater than the extension of the camera which is carried by the trucks 24 and 25. It therefore permits of the maximum movement of the truck 24 without interference therewith. The frame and parts supported thereby are carried on roller wheels 71. To assist in operating the frames 19 and 21, and to maintain the separation thereof to the limit permitted by the rack 18, coil springs 72 are disposed between the two frames, and preferably supported therein by the shafts 66, as seen best in Figure 1ᵇ.

In Figure 5 of the drawings there is shown an arrangement whereby a series of cam boards 31 are employed, also a series of sectors 49. The boards 31 may be of various shapes, as well as the sectors 49, to correspond with various cameras which may be used on the focusing frame. It will be understood that the camera and the frames 19 and 21 thereof, are removable by detachment from the platform of the trucks 24 and 25.

While I have herein described the construction as provided for the primary movement of the truck 24 and frame 21 thereon, and for the secondary or trailing movement of the truck 25 and frame 19, it will be understood this arrangement may be reversed, in which instance the wheel 13 and parts connected therewith will be shifted to form a part of the rear instead of the forward truck.

It will also be understood that when desired a scale may be employed for the movement of the camera, to be read in connection with the positively driven truck or some part associated therewith, thus dispensing with the use of the ground glass in the extension 23. These constructions are obvious and for the sake of clarity have not been disclosed in the accompanying drawings. It is equally obvious that if desired, and particularly when a scale is employed, the end wheel, by means of which the cross shaft 38 is rotated, may be mounted directly on the said shaft.

A further obvious change over the construction shown in the drawings, which may be employed, is that wherein the wheel 30 could operate under rather than over the board 31, said board being shaped to conform with the operation designed.

*Claims.*

1. An apparatus as characterized, comprising an elongated supporting frame; a plurality of camera supporting trucks movably mounted on said frame; a rocking member pivotally mounted on one of said trucks and operatively connected with the other of said trucks; an elongated cam mounted on said supporting frame for actuating said rocking member in correspondence with the movement of the truck supporting said rocking member lengthwise of said supporting frame.

2. An apparatus as characterized, comprising an elongated supporting frame; a plurality of camera supporting trucks movably mounted on said frame; a rocking member pivotally mounted on one of said trucks and operatively connected with the other of said trucks; an elongated cam mounted on said supporting frame for actuating said rocking member in correspondence with the movement of the truck supporting said rocking member lengthwise of said supporting frame; and manually operative propelling mechanism for the truck supporting the rocking member, said propelling mechanism incorporating said supporting frame, 3. An apparatus as characterized, comprising an elongated supporting frame; a plurality of camera supporting trucks movably mounted on said frame; a rocking member pivotally mounted on one of said trucks and operatively connected with the other of said trucks; an elongated cam mounted on said supporting frame for actuating said rocking member in correspondence with the movement of the truck supporting said rocking member lengthwise of said supporting frame; and manually operative propelling mechanism for the truck supporting the rocking member, said propelling mechanism incorporating said supporting frame, said operative mechanism embodying a hand manipulated member carried on the other of said trucks.

4. An apparatus as characterized comprising an elongated supporting frame; a copy board mounted thereon; a plurality of separated camera carrying trucks movably mounted on said frame; manipulative means operatively connecting said frame and one of said trucks for moving said truck lengthwise of said frame and responsive to said manipulative means; means operatively connecting said trucks for relative movement thereof in correspondence with the focal needs of the approximation of the plate holding frame and lens holding frame in correspondence with the approximation of said lens holding frame to said copy board; and means for shifting vertically and laterally said lens holding frame, said means being operable adjacent the plate holding frame.

5. An apparatus as characterized comprising an elongated supporting frame; a copy board mounted thereon; a plurality of separated camera carrying trucks movably mounted on said frame; manipulative means operatively connecting said frame and one of said trucks for moving said truck lengthwise of said frame and responsive to said manipulative means; means operatively connecting said trucks for relative movement thereof in correspondence with the focal needs of the approximation of the plate holding frame and lens holding frame in correspondence with the approximation of said lens holding frame to said copy board; and means for shifting vertically and laterally said lens holding frame, said means being operable adjacent the plate holding frame, said means embodying a slide panel, a lens mounted thereon, and a mechanism for shifting said lens consisting in two separable mechanisms, each having a hand wheel adjacent the plate holding frame, the rotation of one affecting a vertical movement of said slide panel and the rotation of the other affecting a lateral movement thereof.

WENZEL FRITSCHE.